United States Patent [19]

Shirk

[11] Patent Number: 5,651,903

[45] Date of Patent: Jul. 29, 1997

[54] METHOD AND APPARATUS FOR EVALUATING LASER WELDING

[75] Inventor: Bryan W. Shirk, Mesa, Ariz.

[73] Assignee: TRW Inc., Lyndhurst, Ohio

[21] Appl. No.: 542,281

[22] Filed: Oct. 12, 1995

[51] Int. Cl.⁶ .................................................. B23K 26/00
[52] U.S. Cl. ............................... 219/121.64; 219/121.63
[58] Field of Search ......................... 219/121.63, 121.64, 219/121.83

[56] References Cited

U.S. PATENT DOCUMENTS

| | | | |
|---|---|---|---|
| 3,262,006 | 7/1966 | Sciaky et al. . | |
| 4,446,354 | 5/1984 | Kearney | 219/130.01 |
| 4,663,513 | 5/1987 | Webber . | |
| 4,992,643 | 2/1991 | Fuerschbach et al. . | |
| 5,272,312 | 12/1993 | Jurca | 219/121.83 |
| 5,283,416 | 2/1994 | Shirk | 219/121.83 |
| 5,360,960 | 11/1994 | Shirk | 219/121.83 |
| 5,486,677 | 1/1996 | Maischner et al. | 219/121.83 |

FOREIGN PATENT DOCUMENTS

| | | | |
|---|---|---|---|
| 5-337663 | 12/1993 | Japan | 219/121.83 |
| 9303881 | 3/1993 | WIPO | 219/121.83 |

Primary Examiner—Geoffrey S. Evans
Attorney, Agent, or Firm—Tarolli, Sundheim, Covell, Tummino & Szabo

[57] ABSTRACT

An apparatus for monitoring a weld process in which energy (12) is delivered from a laser source (10) to a workpiece (18) along a process path to create a weld, includes a first sensor (26) for monitoring a first weld characteristic of the weld and providing an electrical signal indicative of the first weld characteristic. A second sensor (33) monitors a second weld characteristic and provides an electrical signal indicative of the second weld characteristic. The apparatus also includes a controller (31) that determines (116) a maximum variance of the first weld characteristic and a maximum variance of the second weld characteristic. The controller also determines (128) if the determined maximum variances occur at locations on the weld which are substantially the same. The controller (31), when the maximum variance of the first weld characteristic and the maximum variance of and the second weld characteristic occur at locations on the weld which are substantially the same weld location, compares (138, 144, 150) values functionally related to the first and second weld characteristics against associated predetermined anomaly values indicative of a weld anomaly. The controller produces an error signal when it determines that the value functionally related to the first or the second weld characteristic is indicative of a weld anomaly.

18 Claims, 3 Drawing Sheets

METHOD AND APPARATUS FOR EVALUATING LASER WELDING

TECHNICAL FIELD

The present invention is directed to laser welding and is specifically directed to a method and apparatus for monitoring a laser welding process and providing an evaluation of the process.

BACKGROUND OF THE INVENTION

Laser welding is well known in the art. Systems that monitor a laser welding process and provide an evaluation of the process are also known in the art.

U.S. Pat. No. 4,663,513 to T. Webber discloses use of a laser to deliver energy to a workpiece along a process path for welding purposes. Plasma is produced at a beam delivery point along the process path. A radiation detector is used to detect infrared radiation at a point behind and apart from the location of the beam delivery point. The radiation detector provides an analog temperature signal having a value which varies over time with changes in intensity of the received infrared radiation. The analog temperature signal is compared against a window range of acceptable temperatures. If the temperature signal is not within the window range, a fault signal is produced.

The U.S. Pat. No. 3,262,006 to Sciaky et al. discloses a welding control system having a light sensitive probe and fiber-optics to conduct illumination from an area adjacent a weld to a photo transducer disposed at a remote location. Also, an ultraviolet filter may be employed in the system to see through the flame portion of the weld arc to the inner plasma portion. The U.S. Pat. No. '006 system maintains an electrode at a substantially constant distance from the workpiece.

The U.S. Pat. No. 4,446,354 to Kearney discloses an opto-electronic weld monitoring system employing fiber-optic delivery of incident radiation to a plurality of photo-detectors. The photo-detectors evaluate the weld by separating the received radiation into spectral bands. The output of each photo-detector is compared with a known reference value. A significant deviation in the comparison indicates a fault.

SUMMARY OF THE INVENTION

The present invention is directed toward monitoring a laser process in real time by monitoring levels of light intensity from the weld plasma and temperature of the re-solidified weld puddle, comparing the monitored levels at common maximum variance locations to values from known process anomalies, and determining acceptability of the weld based on the comparison.

In accordance with the present invention, an apparatus monitors a weld process in which energy is delivered from a laser source to a workpiece along a process path to create a weld. The apparatus comprises first sensing means for monitoring a first weld characteristic of the weld and for providing an electrical signal indicative of the first weld characteristic. The apparatus also comprises second sensing means for monitoring a second weld characteristic of the weld and for providing an electrical signal indicative of the second weld characteristic. The apparatus further includes means for determining a maximum variance of the first weld characteristic and a maximum variance of the second weld characteristic and for determining if the determined maximum variances of the first and the second weld characteristics occur at locations on the weld which are substantially the same. When the maximum variances of the first and the second weld characteristics occur at locations on the weld which are substantially the same, control means of the apparatus compares the values functionally related to the first and second weld characteristics against associated predetermined anomaly values indicative of a weld anomaly. The apparatus further includes means for producing an error signal when the control means determines that the value functionally related to the first or the second weld characteristic is indicative of a weld anomaly.

Also in accordance with the present invention, a method is provided for monitoring a weld process in which energy is delivered from a laser source to a workpiece along a process path to create a weld. The method comprises the steps of monitoring a first weld characteristic of the weld and providing an electrical signal indicative of said first weld characteristic and monitoring a second weld characteristic of the weld and providing an electrical signal indicative of said second weld characteristic. A maximum variance of the first weld characteristic is determined, as is a maximum variance of the second weld characteristic. The method also includes the step of determining if the determined maximum variances of the first and the second weld characteristics occur at locations on the weld which are substantially the same. When the maximum variances of the first and the second weld characteristics occur at locations on the weld which are substantially the same, values functionally related to the first and second weld characteristics are compared against associated predetermined anomaly values indicative of a weld anomaly. The method further includes the step of producing an error signal when the comparing step determines that the value functionally related to the first or the second weld characteristic is indicative of a weld anomaly.

BRIEF DESCRIPTION OF THE DRAWINGS

The foregoing and other advantages of the present invention will become apparent to those skilled in the art after a reading and understanding of the following detailed description with reference to the accompanying drawings in which.

DESCRIPTION OF PREFERRED EMBODIMENTS

Figure 1:
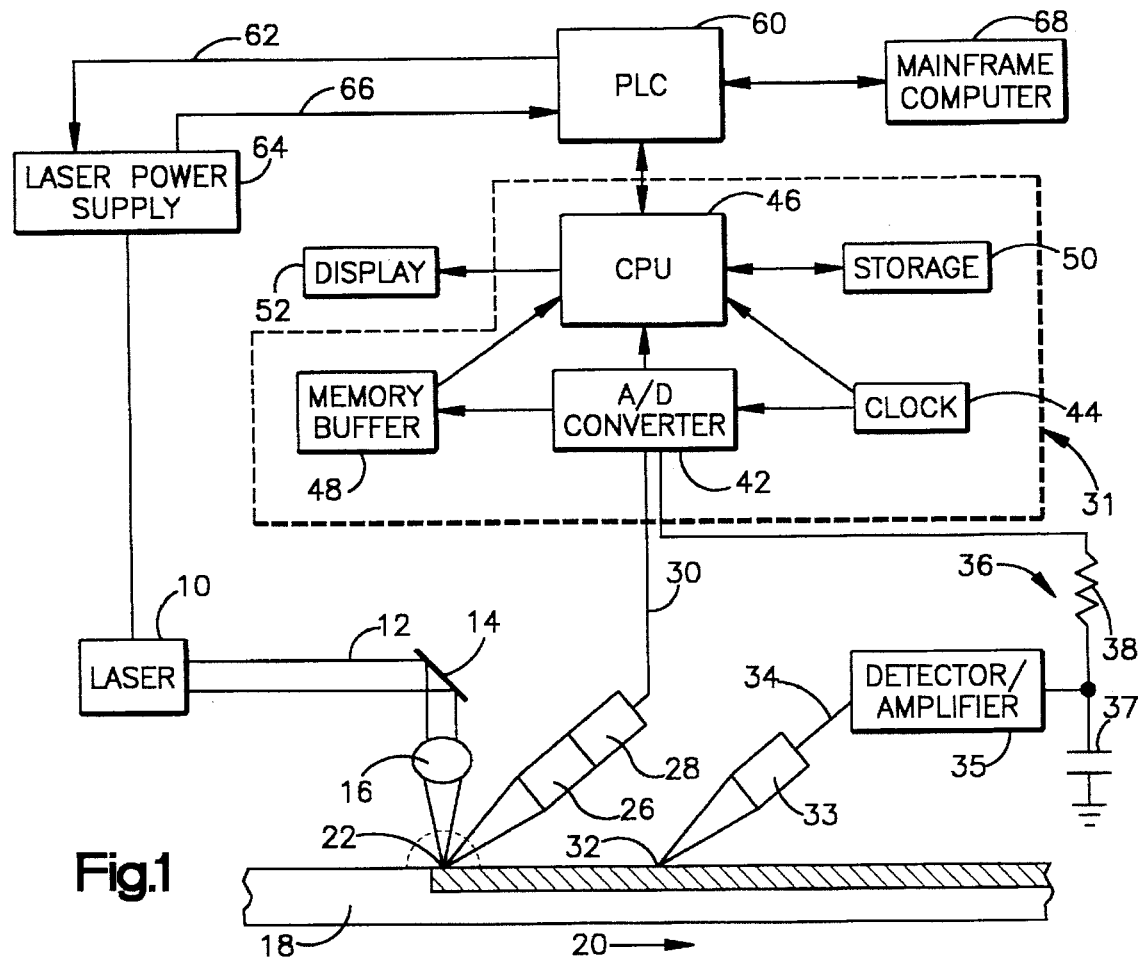
FIG. 1 is a schematic block diagram of a welding and process monitoring system made in accordance with the present invention.

Referring to FIG. 1, a laser 10 transmits a laser beam 12 to a beam delivery system 14. The beam 12 is directed and focused by suitable focusing optics 16 onto a workpiece 18. The workpiece 18 is moved in a direction indicated by the arrow 20 by a workpiece transporting device (not shown). The laser beam 12 is focused on the workpiece 18 at a weld location 22, also referred to as a beam delivery location 22. The laser beam, at the weld location 22, has sufficient energy to form a plasma keyhole and effect a weld in a manner known in the art.

During the welding process, ultraviolet emissions radiate from the plasma at the weld location 22 and are measured by a light sensor 26 such as a focused photo-detector. The output of the light sensor 26 is amplified and electronically filtered by an internal signal processor 28. The signal processor 28 provides an amplified electrical signal indicative of the radiated ultraviolet emissions, i.e., light intensity, from the plasma at the weld location. The ultraviolet emissions signal is transmitted by means of a shielded cable 30 to a microcomputer 31.

At a sensing location 32 a predetermined distance from the beam delivery location 22, the temperature of the re-solidified weld puddle is measured by a temperature sensor 33 such as a focused infrared detector. The output from the temperature sensor 33 is passed by suitable fiber-optic cabling 34 to a detector/amplifier 35. The detector/amplifier 35 comprises an optical detector that converts the detected infrared light into an electrical signal. An amplifier of the detector/amplifier 35 amplifies the electric signal indicative of the infrared light which is, in turn, an electric signal indicative of the weld temperature at the sensing location 32. This electrical temperature signal is applied through a noise filter 36 to the microcomputer 31. The noise filter 36 includes a capacitor 37 and a resistor 38.

The microcomputer 31 may be of conventional design and includes an internal analog-to-digital converter 42 which is supplied with clock pulses from a clock 44. The analog-to-digital converter 42 receives the amplified signal indicative of the ultraviolet emissions from the internal signal processor 28 and the amplified and filtered signal indicative of the weld temperature from the detector/amplifier 35. The digital values of these signals are supplied to a central processing unit ("CPU") 46 of the microcomputer 31 by way of a memory buffer 48. The CPU 46 stores the received values of these two signals in a storage device 50, such as a hard disk drive. A light intensity waveform and other data may be displayed under control of the CPU 46 by means of a conventional display unit 52 such as cathode-ray tube.

The CPU 46 is connected to a programmable logic controller ("PLC") 60. PLC's are well known in the art and, therefore, PLC 60 is not described in detail. The PLC 60 controls the welding operations in response to the monitoring system, i.e., in response to the sensed ultraviolet light intensity and the sensed weld temperature.

The PLC 60 starts the welding operations by applying a "start weld" signal on a control line 62 to a laser power supply 64 which, in turn, energizes the laser 10. The operation of the laser power supply 64 is monitored by the PLC 60 via a feed-back line 66. When the PLC 60 starts a weld operation, it also activates the microcomputer 31 with a trigger signal. The PLC 60 also communicates with a main frame computer 68. The main frame computer 68 is used for long term data storage. The main frame computer 68 facilitates traceability in the event that information is sought at a later time with respect to a particular weld process. Thus, for example, a workpiece serial number may be used to identify particular weld information and permit the computer 68 to find and retrieve that information.

Figure 2:
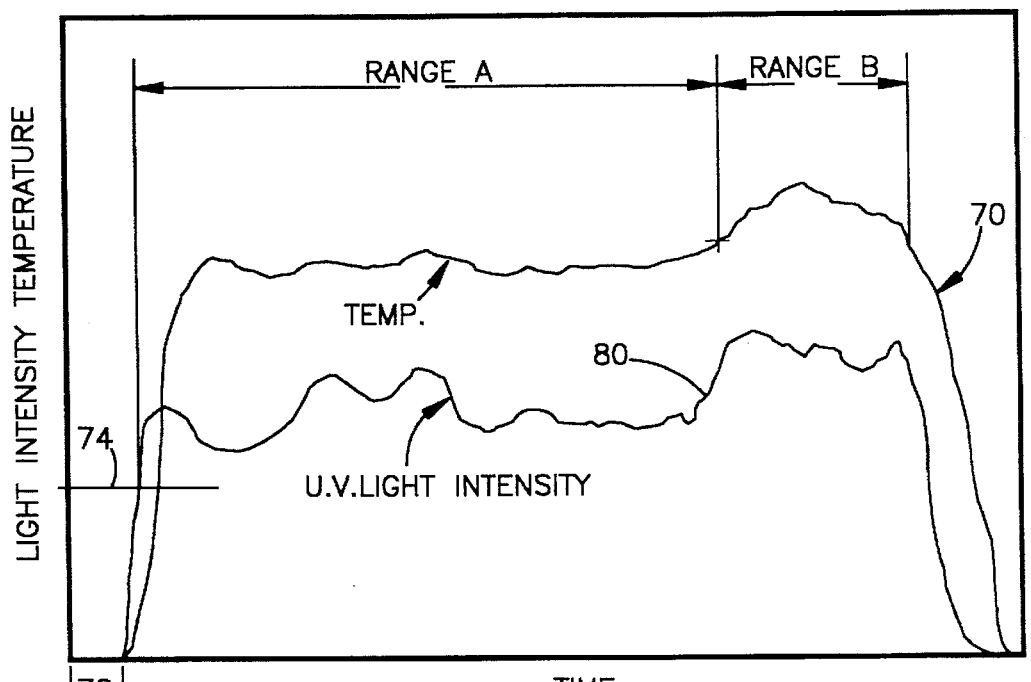
FIG. 2 is a graphical illustration of weld light intensity and temperature of a re-solidified weld puddle with respect to time.

Referring to FIG. 2, a graph is shown of the re-solidified weld temperature 70 and the weld light intensity, i.e., the ultraviolet light, 80 as a function of time. The weld light intensity curve 80 is the average from a plurality of samples taken by the photo detector 26. Similarly, the temperature curve 70 of the re-solidified weld as a function of time is the average from a plurality of samples taken by the infrared detector 33. Each of the curves 70, 80 represents a large number of samples by the analog-to-digital converter 42, e.g., 1,410 over a predetermined time interval. Initially, there is an initial time delay, shown by interval 72, from the start of welding during which samples or measurements by sensors 26, 33 are not used. The trigger delay 72 may, in terms of sample time, have a duration of 100 samples.

Range A is the portion of the weld process where the laser power and speed is regulated to effect a weld that meets predetermined design penetration requirements. Range A starts when the CPU 46 detects a sample value which represents a threshold light intensity that exceeds a predetermined threshold level 74. This predetermined threshold level denotes a weld of sufficient intensity to meet the predetermined design penetration requirement. This range A covers a majority of the weld. Out of a total of 1,410 samples that would occur over an entire weld process, this range may have a time duration equivalent to the time needed to take 1,000 samples. The final or last range of the weld is designated range B. This range B is the overlap portion of a weld where the light intensity value and the temperature value of the weld increase because the surface location and the ambient temperature of the workpiece are higher due to a previously completed weld bead. The light intensity of the plasma in an overlap portion increases due to the shorter distance from the focusing optics 16 to the workpiece surface 18 at the overlap portion. The temperature increases in the overlap portion due to the increased ambient surface temperature of the workpiece surface 18. Range B may have a duration equivalent to the time needed for 300 samplings.

In accordance with the present invention, the weld monitoring system is employed for evaluating light intensity samples taken from the weld plasma and evaluating the temperature of the re-solidified weld bead during the welding operation. This permits the detection of process anomalies such as pinholes, interrupted welds, part mismatches, gaps in the part interface, insufficient laser power, and improper rotational speed. Such weld anomalies have repeatable characteristic patterns in the measured light intensity data and in the temperature data. The monitoring system employs known mathematical methods to characterize the temperature and light intensity data, correlate the characterizations to each other, and then compare the results against known patterns from process anomalies.

The microcomputer 31 is programmed, as is discussed below, to perform these calculations, correlations, and comparisons with data stored in the operating program in the CPU 46. Whether the weld is acceptable or not is information that is supplied by the microcomputer 31 to the PLC 60 along with the determined process anomaly which was the cause of the rejection. The microcomputer 31 displays the light intensity and temperature waveform on its display 52 and also displays the weld acceptability or rejection status as well as the determined process anomaly.

Figure 3A:
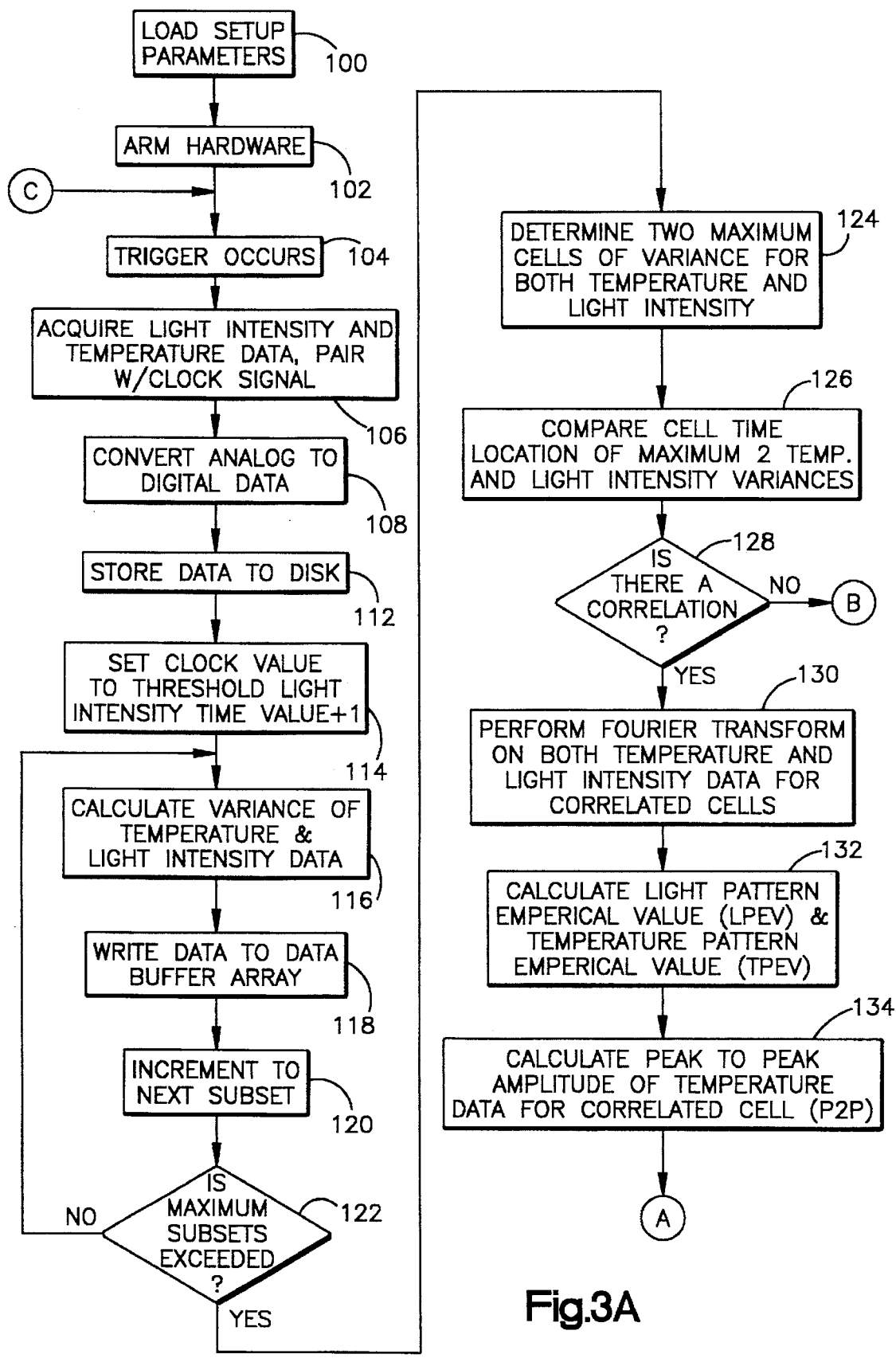
FIGS. 3A and 3B are flow chart diagrams illustrating the control process of the weld monitoring system shown in FIG. 1.
Figure 3B:
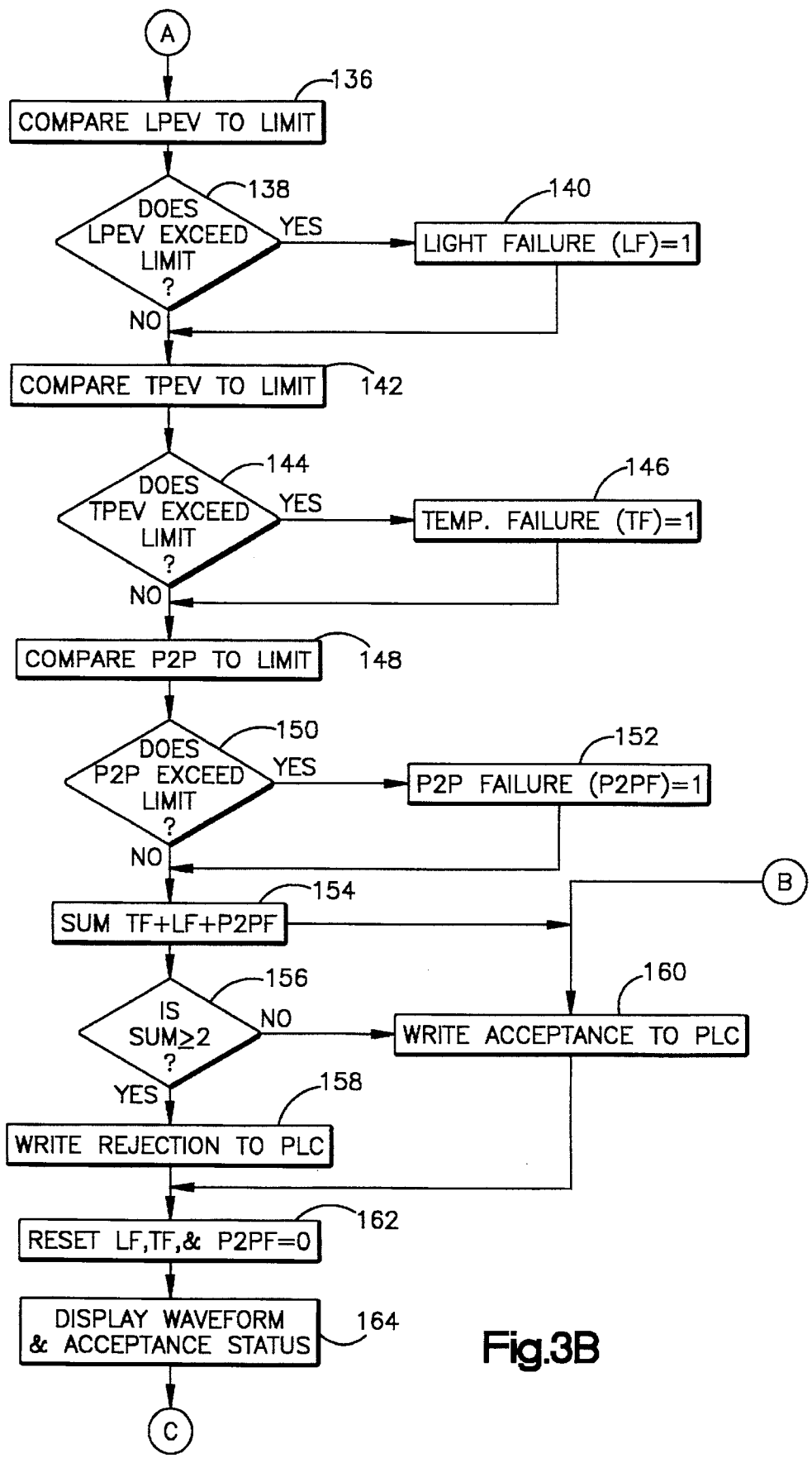

FIGS. 3A and 3B show the control process, in accordance with the present invention, performed by the microcomputer 31. The process starts at step 100 in which various system parameters needed for the control process are entered. These parameters may be entered by any of a plurality of known means such as with a keyboard, a touch screen, bar code reader, or through the storage device (disk drive) 50 reading stored .ini files. The use of .ini files for entry of operating parameters is known in the art. The parameters for the control process of the present invention include the duration of test, the test acquisition rate, weighting factors for use in calculation of the empirical values, and limits for use with the empirical values. The process proceeds to step 102 where the microcomputer 31 waits for a trigger signal from the PLC 60 to commence data acquisition. For the purpose of understanding the system operation, it is assumed that the trigger signal occurs at step 104.

At step 106, the light intensity data and temperature data are acquired and paired with a clock signal so as to obtain time identified data. The acquired data is converted by the analog-to-digital converter 42 at step 108 so as to provide a stream of digital data words representative of respective light intensity samples and temperature samples. The data words are stored on the hard disk storage 50 device at step 112. The CPU 46 then starts analyzing the acquired data.

At step 114, a clock counter is set to one plus the time value at which the sampled light intensity value first exceeds a threshold light intensity limit 74. The first data sample to be analyzed is retrieved from storage device 50 with the remaining samples to be incremented one at a time using an internal pointer. In step 100, the number of samples to be analyzed was entered. This value is used to determine the number of samples which will be incrementally pulled from the storage device at step 116 to define a cell in a data array. Once the data of a cell has been loaded into CPU 46, step 116 calculates the variance for both the temperature and light intensity data. The variance is the square of the standard deviation. These calculated variances are then written to a data buffer array in step 118. At step 120, the internal memory pointer is incremented to point at the next set of data which define the next cell in the data array.

The process then proceeds to step 122 where a determination is made as to whether the maximum number of cells in the data array has been exceeded, i.e., whether the end of the data file has been reached. So long as the end of the data file has not been reached, the program loops through steps 116 through step 122 inclusively. Upon reaching the end of the data file, the determination of step 122 will be affirmative, which allows the program to progress to step 124.

In step 124, the temporal locations of the two (2) cells with the two highest variances of light intensity data and the two (2) cells with the two highest variances of temperature data are noted. These cell location times are then compared in step 126. Since the physical locations 22, 32 are spaced apart and the workpiece 18 is moving, the cell location times are adjusted so that the light intensity data and the temperature data used for the comparison relate to the same weld locations on the workpiece. The time adjustment is a function of the distance between the beam delivery location 22 and the sensing location 32, the workpiece speed, and the sampling speed. If, in step 128, either of the two cells with the highest temperature variances is at the same adjusted time location as either of the two cells with the two highest light intensity variances, the program proceeds to step 130. If the determination in step 128 is negative, the process proceeds to step 162 where an acceptance will be written to the PLC 60.

If the determination in step 128 is positive, the process proceeds to step 130, where a Fourier transform is performed on the correlated light intensity cell and temperature data cell. This transforms the data from time domain data to frequency domain data. Weighting factors entered in at step 100 are used in step 132 to calculate a light pattern empirical value (LPEV) and a temperature pattern empirical value (TPEV). These empirical values are based on observations of the data frequency responses from known process anomalies.

Empirical testing is used to identify frequency ranges which provide a response for the particular anomalies of concern. Both the light intensity data and the temperature data may have one or more frequency ranges that yield useful information. When the data from the correlated light intensity cell and the temperature cell are converted to the frequency domain, each cell will have a plurality of amplitude values present within an associated frequency range or ranges. For the purpose of explanation, assume the light data is monitored over two separate frequency ranges because empirical data has indicated that these two frequency ranges yield good anomaly information. The amplitudes of the transformed light data for one of the frequency ranges is summed and that sum is then multiplied by an associated weighting factor. The amplitudes of the transformed light date for the other of the frequency ranges is summed and that sum is then multiplied by an associated weighting factor. The two products are then added together to provide the LPEV. The value of the TPEV is similarly determined.

The weighting factors are determined by the significance of a particular frequency range to identifying an anomaly. For example, if a frequency range provides a significant indication of an anomaly, the weighting factor is 1. If the frequency range provides a less significant indication of an anomaly, the weighting factor can be 0.8.

In step 134, the peak-to-peak amplitude (P2P) of the temperature data of the correlated temperature data cell is calculated. At step 136, the LPEV is compared to the empirical light limit value which was loaded in step 100. If the LPEV exceeds the light limit in step 138, a light failure (LF) flag is set to true (or equal to 1) at step 140. The program then progresses to step 142. If the LPEV does not exceed the light limit in step 138, the program progresses directly to step 142.

In step 142, the TPEV is compared to the empirical temperature limit value loaded in step 100. If the TPEV exceeds the temperature limit in step 144, the program progresses to step 146 wherein the temperature failure (TF) flag is set true (or equal to 1). The program then progresses to step 148. If there is a negative determination in step 144, the program progresses directly to step 148. In step 148, the P2P is compared to its empirical limit which was entered in step 100. If the determination in step 150 is affirmative, the program progresses to step 152 where the P2P failure (P2PF) flag is set true (or equal to 1). The program then progresses to step 154. If the determination is negative in step 150, the program progresses directly to step 154.

The sum TF+LF+P2PF is determined in step 154. The sum from step 154 is compared to the value 2 in step 156. If the sum is greater than or equal to 2 (i.e., more than one of the prior determinations were found to be true), the workpiece is rejected and the program progresses to step 158 wherein a reject code, along with the analysis routine which determined the reject status is written to the PLC 60. The rejection status may also be displayed on display 52. Should the sum in step 156 be found to be less than 2, the program progress to step 160 where an acceptance status is written to the PLC 60. At this point, the acceptance information may be forwarded to the main frame computer 68 by the PLC 60 for archival storage. In step 162, LF, TF, and P2PF are reset to zero. The temperature and light intensity waveforms, such as waveforms 70 and 80, along with the acceptance status and the analysis routine that was used to reject the part (should a reject occur), are displayed on the video display 52 in step 164. The system then returns to step 104 for monitoring of another weld process and the determination of the weld acceptability.

From the above description of the invention, those skilled in the art will perceive improvements, changes and modifications. For example, the determination of LPEV and TPEV have been explained as being determined using Fourier transforms. Those skilled in the art will appreciate that, instead of Fourier transforms, Savitzky-Golay transforms, Hilbert transforms, LaPlace transforms, cubic-spline interpolation, or instantaneous range analysis could be used. Such improvements, changes, and modifications within the skill of the art are intended to be covered by the appended claims.

Having described the invention, we claim the following:

1. An apparatus for monitoring a weld process in which energy is delivered from a laser source to a workpiece along a process path to create a weld, said apparatus comprising:

first sensing means for monitoring a first weld characteristic of said weld and providing an electrical signal indicative of said first weld characteristic;

second sensing means for monitoring a second weld characteristic and providing an electrical signal indicative of said second weld characteristic;

means for determining a maximum variance of said first weld characteristic and a maximum variance of said second weld characteristic and for determining if said determined maximum variances of said first and said second weld characteristics occur at locations on said weld which are substantially the same;

control means for, when said maximum variance of said first weld characteristic and said maximum variance of and said second weld characteristic occur at locations on said weld which are substantially the same weld location, comparing values functionally related to said first and second weld characteristics against associated predetermined anomaly values indicative of a weld anomaly; and means for producing an error signal when said control means determines that the value functionally related to said first or said second weld characteristic is indicative of a weld anomaly.

2. The apparatus of claim 1 wherein said first sensing means senses light intensity of the weld and wherein said second sensing means senses temperature of the weld.

3. The apparatus of claim 2 wherein said first sensing means includes an ultraviolet light sensor and wherein said second sensing means includes an infrared sensor.

4. The apparatus of claim 2 wherein said second sensing means senses the temperature of the weld a predetermined distance from a location at which the energy from the laser source contacts the workpiece.

5. The apparatus of claim 1 wherein said means for determining a maximum variance of said first weld characteristic and said second weld characteristic includes means for determining said variances over discrete samplings of associated data.

6. The apparatus of claim 5 wherein said means for determining a maximum variance determines at least two maximum variance values for both said first weld characteristic and said second weld characteristic.

7. The apparatus of claim 1 including means for recording weld status.

8. An apparatus for monitoring a weld process in which energy is delivered from a laser source to a workpiece along a process path to create a weld, said apparatus comprising:

an ultraviolet light sensor for monitoring ultraviolet light intensity at a location at which the energy from the laser source contacts the workpiece and for providing an electrical signal indicative of said ultraviolet light intensity;

an infrared sensor for monitoring temperature of the weld a predetermined distance from the location at which the energy from the laser source contacts the workpiece and for providing an electrical signal indicative of said temperature;

means for determining a maximum variance of said light intensity and a maximum variance of said weld temperature and for determining if said determined maximum variances occur at locations on said weld which are substantially the same;

control means for, when said maximum variance of said ultraviolet light intensity and said maximum variance of said weld temperature occur at locations on said weld which are substantially the same, comparing values functionally related to said light intensity and weld temperature against associated predetermined anomaly values indicative of a weld anomaly said control means includes means for transforming values of said ultraviolet light intensity and said weld temperature from the time domain to the frequency domain using Fourier transforms prior to the comparisons with their associated anomaly values; and means for producing an error signal when said comparing means determines that transformed values of said ultraviolet light intensity or said weld temperature are indicative of a weld anomaly.

9. A method for monitoring a weld process in which energy is delivered from a laser source to a workpiece along a process path to create a weld, said method comprising the steps of:

monitoring a first weld characteristic of said weld and providing an electrical signal indicative of said first weld characteristic;

monitoring a second weld characteristic of said weld and providing an electrical signal indicative of said second weld characteristic;

determining a maximum variance of said first weld characteristic and a maximum variance of said second weld characteristic;

determining if said determined maximum variances of said first and said second weld characteristics occur at locations on said weld which are substantially the same;

comparing, when said maximum variances of said first and said second weld characteristics occur at locations on said weld which are substantially the same, values functionally related to said first and second weld characteristics against associated predetermined anomaly values indicative of a weld anomaly; and producing an error signal when said comparing step determines that the value functionally related to said first or said second weld characteristic is indicative of a weld anomaly.

10. The method of claim 9 wherein said step of monitoring said first weld characteristic includes monitoring light intensity at the location at which energy from said laser source contacts the workpiece and wherein said step of monitoring said second weld characteristic includes monitoring weld temperature at a location spaced from said location at which energy from said laser source contacts the workpiece.

11. The method of claim 10 wherein said step of monitoring light intensity includes monitoring ultraviolet light and wherein said step of monitoring weld temperature includes monitoring infrared energy.

12. The method of claim 9 further including the step of recording the weld status.

13. The method of claim 9 wherein said step of determining a maximum variance of said first weld characteristic and said second weld characteristic includes determining said variances over discrete samplings of associated data.

14. The method of claim 13 wherein said step of determining a maximum variance determines at least two maximum variance values for both said first weld characteristic and said second weld characteristic.

15. An apparatus for monitoring a weld process in which energy is delivered from a laser source to a workpiece along a process path to create a weld, said apparatus comprising:

first sensing means for monitoring a first weld characteristic of said weld and providing an electrical signal indicative of said first weld characteristic;

second sensing means for monitoring a second weld characteristic and providing an electrical signal indicative of said second weld characteristic;

means for determining a maximum variance of said first weld characteristic and a maximum variance of said second weld characteristic and for determining if said determined maximum variances of said first and said second weld characteristics occur at locations on said weld which are substantially the same;

control means for, when said maximum variance of said first weld characteristic and said maximum variance of said second weld characteristic occur at locations on said weld which are substantially the same weld location, comparing values functionally related to said first and second weld characteristics against associated predetermined anomaly values indicative of a weld anomaly; and means for producing an error signal when said control means determines that the value functionally related to said first or said second weld characteristic is indicative of a weld anomaly;

said control means including means for determining said values functionally related to said first and said second weld characteristics and including means for transforming values of said first and second weld characteristics from a time domain value to a frequency domain prior to the comparisons with their associated anomaly values.

16. The apparatus of claim 15 wherein said means for transforming includes means for determining a Fourier transform.

17. A method for monitoring a weld process in which energy is delivered from a laser source to a workpiece along a process path to create a weld, said method comprising the steps of:

monitoring a first weld characteristic of said weld and providing an electrical signal indicative of said first weld characteristic;

monitoring a second weld characteristic of said weld and providing an electrical signal indicative of said second weld characteristic;

determining a maximum variance of said first weld characteristic and a maximum variance of said second weld characteristic;

determining if said determined maximum variances of said first and said second weld characteristics occur at locations on said weld which are substantially the same;

comparing, when said maximum variances of said first and said second weld characteristics occur at locations on said weld which are substantially the same, values functionally related to said first and second weld characteristics against associated predetermined anomaly values indicative of a weld anomaly; and producing an error signal when said comparing step determines that the value functionally related to said first or said second weld characteristic is indicative of a weld anomaly;

said step of comparing including the step of transforming values of said first and second characteristics from a time domain value to a frequency domain value prior to the comparing with their associated anomaly values.

18. The method of claim 17 wherein said step of transforming includes determining a Fourier transform of said first and second characteristics.

* * * * *